(12) United States Patent
Sheldon

(10) Patent No.: US 7,942,521 B2
(45) Date of Patent: *May 17, 2011

(54) GLASSES WITH REFLECTIVE FRAMES

(76) Inventor: Brent Sheldon, Montreal (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/898,960

(22) Filed: Oct. 6, 2010

(65) Prior Publication Data

US 2011/0019145 A1    Jan. 27, 2011

Related U.S. Application Data

(63) Continuation-in-part of application No. 12/404,607, filed on Mar. 16, 2009, now Pat. No. 7,828,427.

(51) Int. Cl.
*G02C 11/02* (2006.01)
(52) U.S. Cl. .............................. 351/52; 351/51; 351/121
(58) Field of Classification Search .................... 351/52, 351/51, 158, 41, 121
See application file for complete search history.

(56) References Cited

U.S. PATENT DOCUMENTS

| | | | |
|---|---|---|---|
| 1,555,388 A | 9/1925 | Schumacher | |
| D151,698 S | 11/1948 | Levoy | |
| D152,487 S | 1/1949 | Mangold | |
| D172,671 S | 7/1954 | Kono | |
| D178,307 S | 7/1956 | Margules | |
| 2,766,541 A | 10/1956 | Quinones et al. | |
| D205,097 S | 6/1966 | Mitchell | |
| 4,266,849 A | 5/1981 | Warner | |
| 4,715,702 A | 12/1987 | Dillon | |
| 4,934,792 A | 6/1990 | Tovi | |
| 5,884,331 A | 3/1999 | Barajas | |
| 5,892,600 A | 4/1999 | Kuo | |
| 6,020,983 A | 2/2000 | Neu et al. | |
| 6,036,310 A | 3/2000 | Moetteli | |
| 6,641,262 B1 | 11/2003 | Cheng | |
| 6,948,808 B1 | 9/2005 | Callahan | |
| 7,163,290 B2 | 1/2007 | Paolino | |
| 7,261,409 B1 | 8/2007 | Taber | |
| 7,364,288 B2 | 4/2008 | Huang | |
| 7,828,427 B2 * | 11/2010 | Sheldon | 351/52 |
| 2010/0231853 A1 | 9/2010 | Sheldon | |

FOREIGN PATENT DOCUMENTS

| | | |
|---|---|---|
| CA | 2377390 | 10/2001 |
| CA | 2504575 | 10/2005 |
| GB | 1223173 | 2/1971 |

OTHER PUBLICATIONS

Tougaw, D. et al.; "Visualizing the Future of Virtual Reality"; Computing in Science & Engineering; vol. 5, No., pp. 8-11, Jul./Aug. 2003; Published by the IEEE CS and AIP.

* cited by examiner

*Primary Examiner* — Hung X Dang
(74) *Attorney, Agent, or Firm* — Ogilvy Renault LLP

(57) ABSTRACT

A structure of reflective glasses includes a frame having a main front section with opposed side ends for supporting at least one lens, the frame further including a pair of side sections extending rearwardly from the respective opposed side ends of the main front section and at least one retroreflective element attached to at least one of the side sections to be visible by others in low-light conditions.

11 Claims, 5 Drawing Sheets

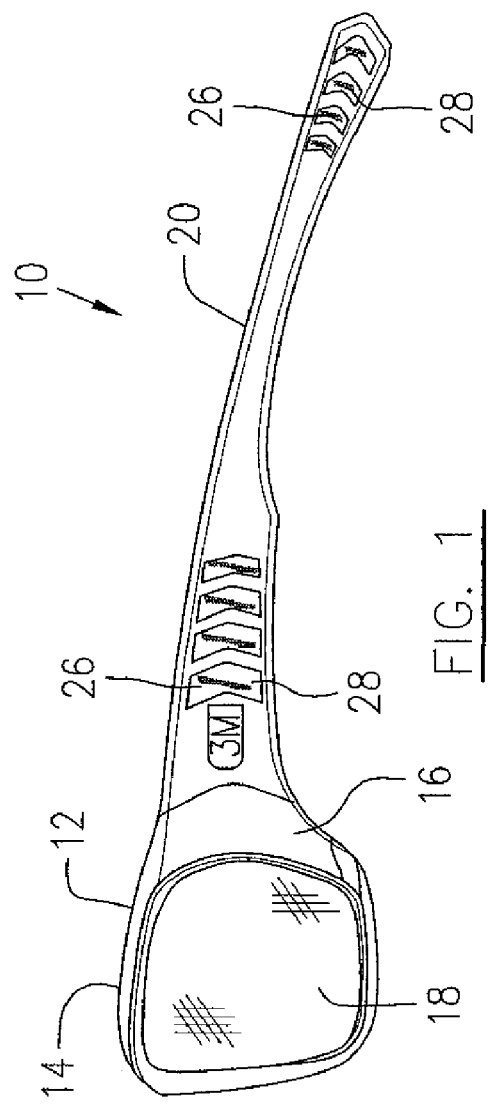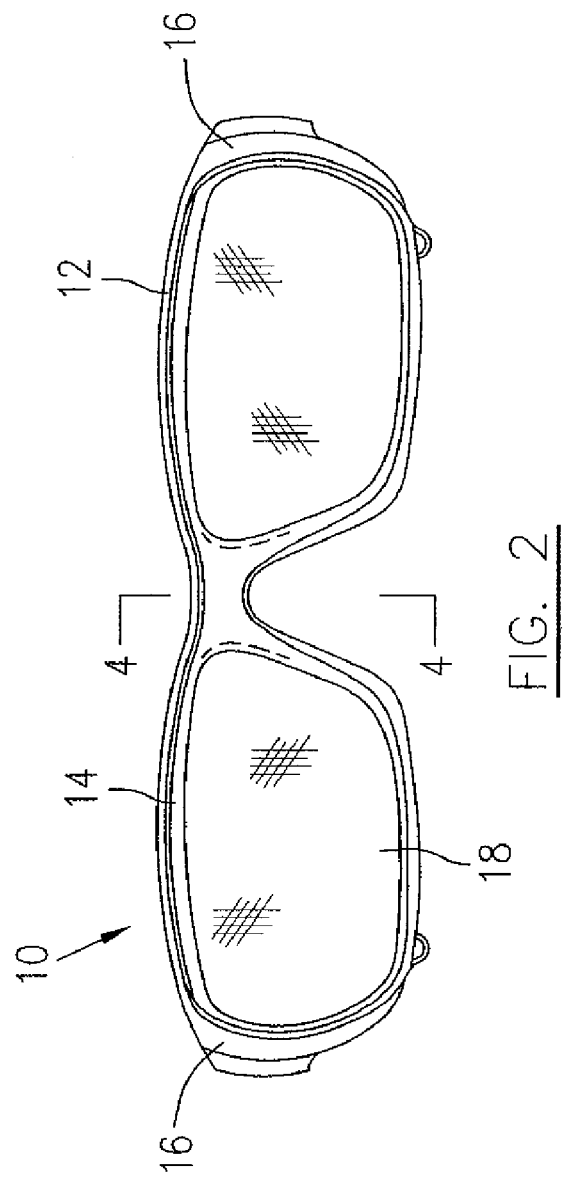

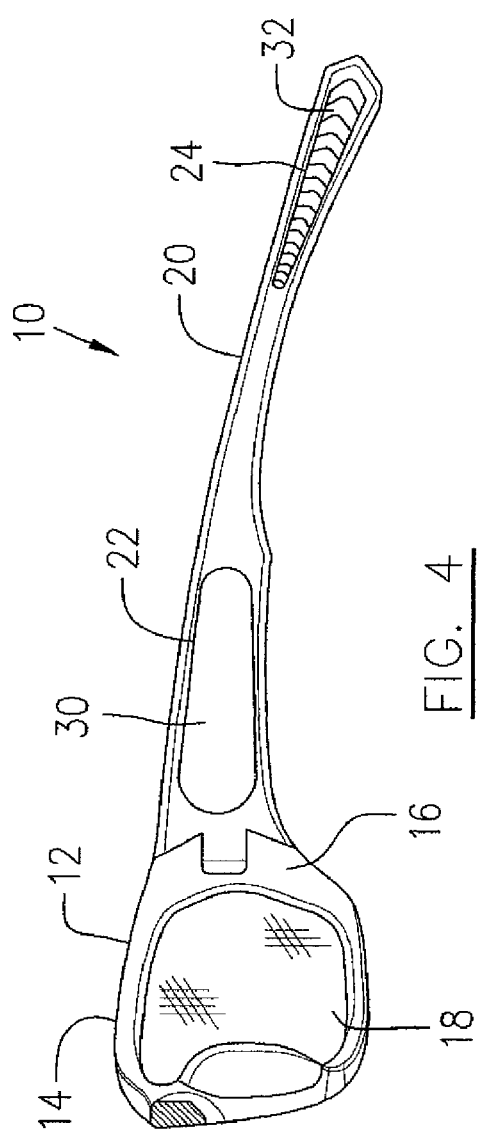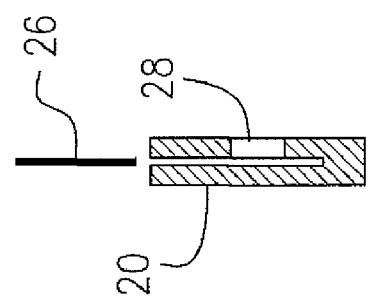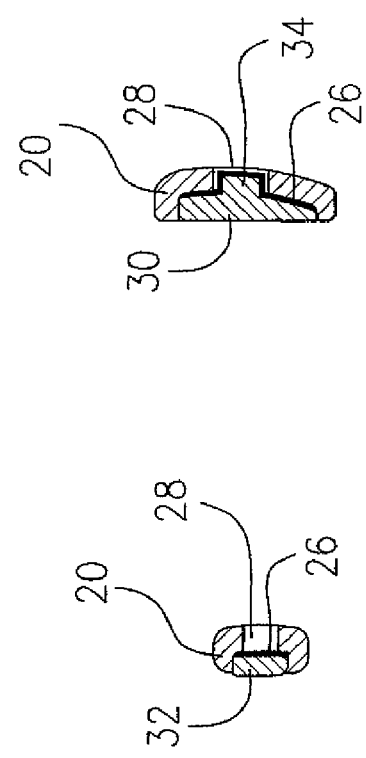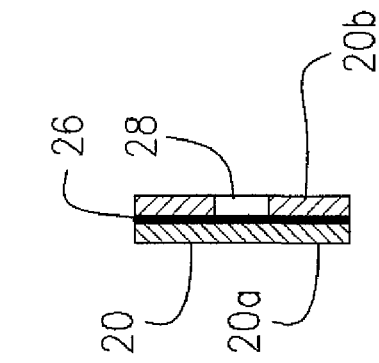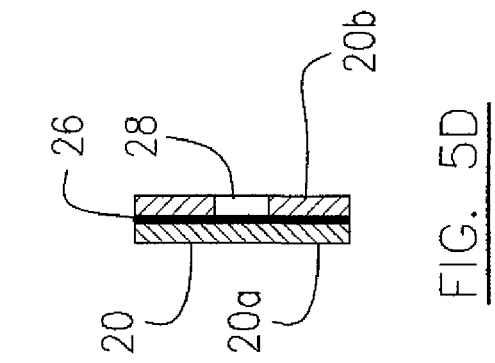

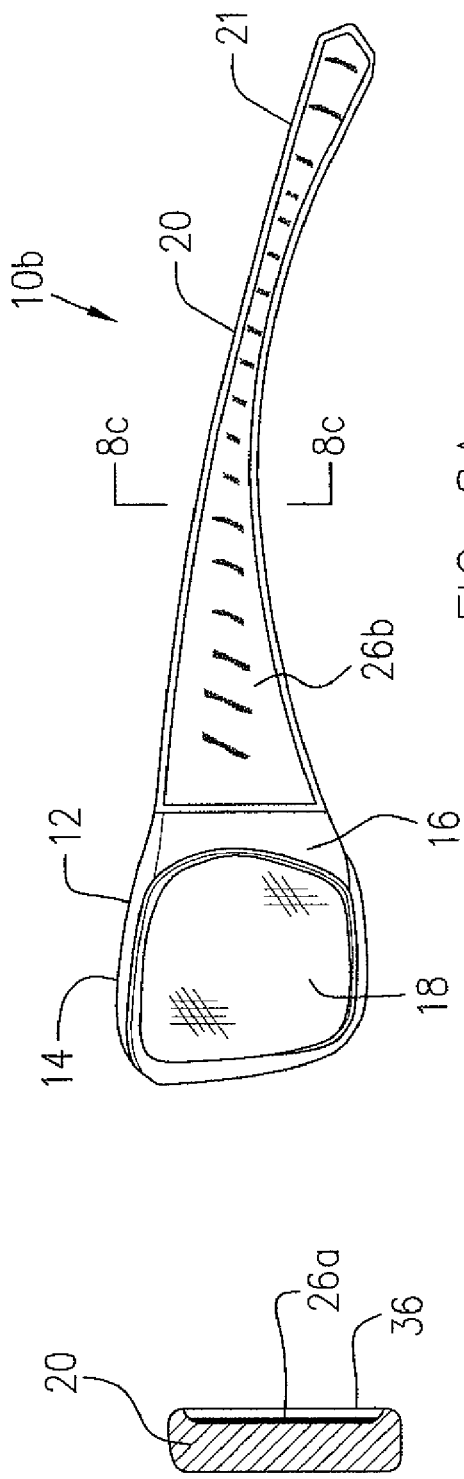
FIG. 8A
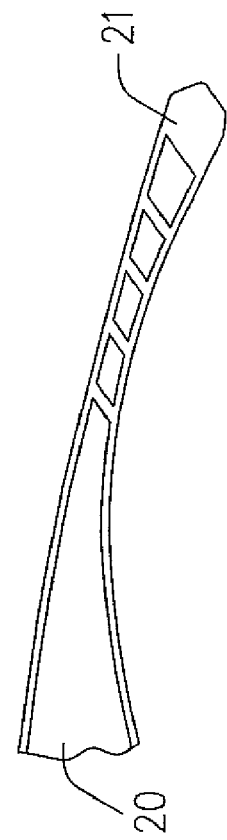
FIG. 8B
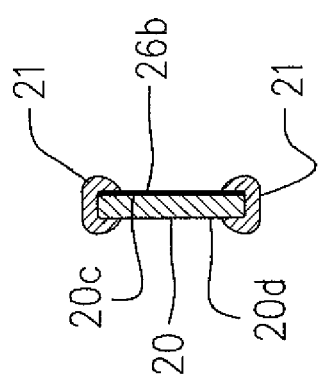
FIG. 7
FIG. 8C

GLASSES WITH REFLECTIVE FRAMES

CROSS-REFERENCE TO RELATED APPLICATIONS

This application is a Continuation-In-Part of Applicant's application Ser. No. 12/404,607, filed on Mar. 16, 2009, now U.S. Pat. No. 7,828,427.

TECHNICAL FIELD

The present invention relates to an improvement on a structure of glasses, and more particularly to a structure of glasses having a frame with attached retroreflective elements.

BACKGROUND OF THE INVENTION

Safety glasses are used to protect users' eyes from injuries, for example when participating in sports or while working. In some cases it is desirable to have safety or other types of glasses which are luminous or capable of reflecting light. However, such reflective glasses are currently not popular in the marketplace. The light-reflective feature of currently available glasses is not very effective due to the limited outer surface of glasses frames and the limited light reflecting capabilities of materials currently used with eyewear. It is also desirable to avoid interference with the user's vision, which may be caused by the reflection of the reflective elements of glasses into the user's eyes.

Accordingly, there is a need for an improved structure of reflective glasses which may be for glasses of all types, including children's glasses.

SUMMARY OF THE INVENTION

In accordance with one aspect of the present invention, there is provided a structure of reflective glasses comprising a frame having a main front section with opposed side ends for supporting at least one lens, the frame further including a pair of side sections extending rearwardly from the respective opposed side ends of the main front section; and at least one retroreflective element attached to at least one of the side sections, the retroreflective element reflecting human-eye-visible light rays of any incidence angle along a vector parallel to but opposite in direction from a source of said light rays.

Optionally, the side sections may comprise a pair of arms pivotable with respect to the main front section. Also optionally, at least one retroreflective element may be attached to at least one of the arms.

Other aspects or features of the present invention will be better understood with reference to the preferred embodiments described hereinafter.

BRIEF DESCRIPTION OF THE DRAWINGS

Reference is now made to the accompanying drawings, showing by way of illustration the preferred embodiments thereof, in which:

FIG. 1 is a side elevational view of reflective glasses according to one embodiment, having openings in the arms to expose the retroreflective elements attached thereto;

FIG. 2 is a front elevational view of the reflective glasses of FIG. 1;

FIG. 4 is a cross-sectional view of the reflective glasses taken along line 4-4 in FIG. 2, showing an inner side of the arms with retroreflective element retaining members attached thereto;

FIG. 5A is a cross-sectional view of the arms taken along line 5A-5A of FIG. 3, showing a recess and opening defined in the arm, a retaining member and a piece of retroreflective fabric received in the recess;

FIG. 5B is a cross-sectional view of the arm taken along line 5B-5B of FIG. 3, showing a rubber holder also functioning as a retroreflective element retaining member;

FIG. 5C is a cross-sectional view of the arm similar to that of FIG. 5A, showing an alternative configuration in which a projecting element of the retaining member presses a portion of the retroreflective fabric into the opening;

FIG. 5D is a cross-sectional view of the arm similar to that of FIG. 5A, showing another alternative configuration in which the retroreflective fabric is sandwiched between inner and outer layers of the arm;

FIG. 5E is a cross-sectional view of the arm similar to FIG. 5A, showing a further alternative configuration in which the retroreflective fabric is inserted into a groove of the arm;

FIG. 7 is a cross-sectional view of the arm taken along line 7-7 of FIG. 6, showing a recess defined in the outer side of the arm for receiving a retroreflective element therein;

FIG. 8A is a side elevational view of the reflective glasses according to a further embodiment;

FIG. 8B is a partial side elevational view of an arm of the retroreflective glasses of FIG. 8A, showing the back side of the arm;

FIG. 8C is a cross-sectional view of the arm of the retroreflective glasses, taken along line 8C-8C of FIG. 8A.

It will be noted that throughout the appended drawings, like features are identified by like reference numerals.

DETAILED DESCRIPTION OF THE PREFERRED EMBODIMENTS

Figure 3:
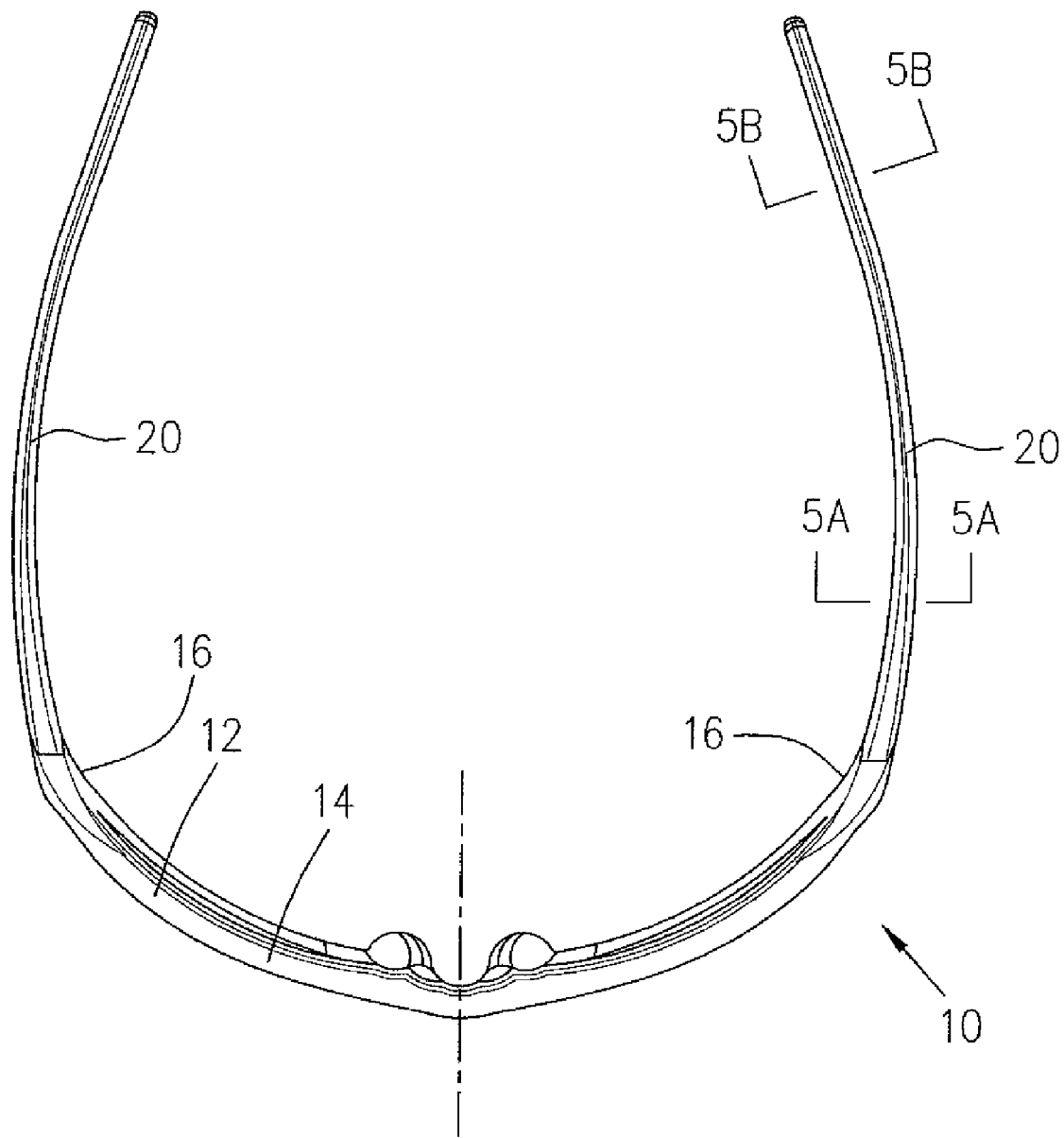
FIG. 3 is a top plan view of the reflective glasses of FIG. 1.

Referring to FIGS. 1 through 5B, a structure of reflective glasses 10 according to one embodiment generally includes a frame 12 which for example may be made of a plastic material in a molding process, having a main front section 14 with opposed side ends 16 for supporting one or two lenses 18. The frame 12 further includes a pair of side sections (not numbered) extending rearwardly from the respective opposed side ends 16 of the main front section 14. The rearwardly extending side sections of the frame 14 according to this embodiment, are a pair of arms 20 pivotally joined to the respective opposed side ends 16 of the main front section 14 in a conventional manner. One or more retroreflective elements are attached to at least one of the side sections which are the respective arms 20 in this embodiment, such that the attached retroreflective elements are visible by others in low-light conditions.

Retroreflective materials, such as 3M™ Scotchlight™ reflective material products, use a technology to provide retroreflection which enables the human eye to perceive light in low-light conditions. In more scientific terms, retroreflection occurs when light rays are returned in the direction from which they came. An electromagnetic wave front is reflected back by a reflection surface, along a vector that is parallel to but opposite in direction from the wave source. The retroreflection surface's angle of incidence is greater than zero. This is unlike other conventional reflective surfaces such as a planar mirror, which does so only if the mirror is exactly perpendicular to the wave front (a zero angle of incidence). Retroreflective materials return a relatively large amount of reflected light directly to the original light source, such as a car's headlights. Since very little light is scattered when the light is returned, retroreflective materials appear brightest to an observer located near the original light source regardless of the observation angles. Therefore, retroreflective materials have been widely used for road signs and on garments but have not been used with small objects like eyewear.

It should be understood that the light discussed throughout this document is particularly limited to "human-eye-visible" light for the purposes of this invention.

In particular, the arms 20 of reflective glasses 10 each have a large recess 22 and a small recess 24 defined in an inner side (not numbered) of the arm 20. The large recess 22 is located near the jointed end and the small recess 24 is located near the free end of the arm 20. A piece of retroreflective fabric 26 which has reflective lenses bonded to a fabric backing to form a retroreflective surface, is placed within the respective recess 22, 24 with the retroreflective surface against a recess bottom (not numbered). Each of the recesses 22, 24 defines at least one profiled opening (a plurality of profiled openings 28 in a desired design according to this embodiment), which extends from the recess bottom through the arm 20 to an outer side (not numbered) of the arm 20 to expose the retroreflective surface of the respective retroreflective fabric 26 in a desired design.

Retaining members 30, 32 are provided within the respective recesses 22, 24 for retaining the retroreflective fabric 26 in place. Each of the retaining members 30, 32 is formed, for example with a base section (not numbered) having first and second opposed sides (not numbered). The first side of the base section substantially corresponds with the contour of the recess bottom of the respective recesses 22, 24 to press the retroreflective fabric 26 against the recess bottom. The second side of the base section of the retaining member 30 may be substantially flush with the inner side of the arm 20. The retaining member 32 may be made of a soft material such as rubber to also function as a holding element of the arm 20 to hold the reflective glasses 10 in place on the user's head. Therefore, the second side of the base section of the retaining member 32 may be made as a slight projection on the inner side of the arm 20 for a firm contact with a user's head.

In an alternative structure as shown in FIG. 5C, the retaining member 30 may further include a projecting element 34 extending outwardly from the first side of the base section for pressing a portion of the piece of retroreflective fabric 26 into the opening 28 towards the outer side of the arm 20. The number and profile of the projecting elements 34 of the retaining member 30 will correspond with the desired design of the openings 28.

In another alternative structure as shown in FIG. 5D, the arm 20 has separate inner and outer layers 20a, 20b. The inner layer 20a forms a basic body of the arm 20 and the outer layer 20b which may be smaller, such as shorter in length than the inner layer 20a, has the opening(s) 28 designed in any desired shape. A piece of retroreflective fabric 26 in an adequate size may be attached to the inner layer 20a of the arm, for example by applying adhesive. The outer layer 20b with adhesive is then pressed onto the side of the inner layer 20a to which the piece of the retroreflective fabric is attached. The retroreflective surface of the retroreflective fabric 26 is exposed through the opening(s) 28. It should be noted that the inner and outer layers 20a and 20b may be made of different materials.

In a further alternative structure as shown in FIG. 5E, the arm 20 has a groove 27 extending inwardly from either a top or bottom edge of the arm 20 (as an example, the groove 27 may extend downwardly from a top edge of the arm 20 as in this illustration). A piece of the retroreflective fabric 20 is inserted into the groove 27. Opening(s) 28 defined in an outer wall (not indicated) of the groove 27 allow(s) the retroreflective surface of the retroreflective fabric 26 to be exposed. Adhesive may be applied to secure the piece of retroreflective fabric 26 in position. Optionally, the piece of retroreflective fabric 26 may be attached to a backing member (not shown) such as a piece of thin metal plate before insertion, in order to facilitate the insertion process.

Figure 6:
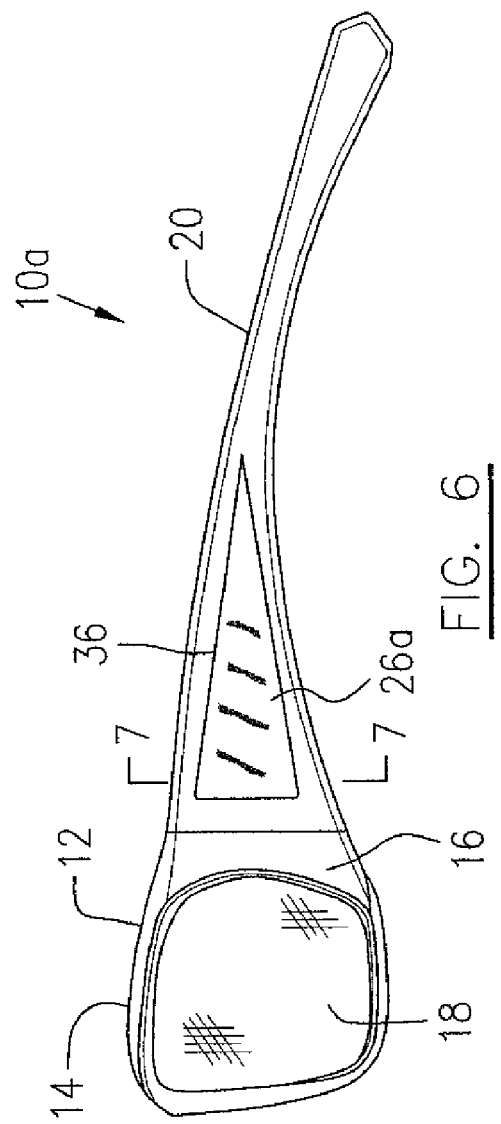
FIG. 6 is a side elevational view of the reflective glasses according to another embodiment.

FIGS. 6 and 7 illustrate a structure of reflective glasses 10a according to another embodiment. Reflective glasses 10a include components and features indicated by numerals similar to those of reflective glasses 10 shown in FIGS. 1-4, and will not be redundantly described herein. The difference between the reflective glasses 10a and reflective glasses 10 of FIGS. 1-4 substantially lies in the attachment of retroreflective elements thereto. Instead of having recess 22, 24 defined in the inner side of the respective arms 20 of reflective glasses 10 as shown in FIG. 4, the reflective glasses 10a have a profiled shallow recess 36 defined in the outer side of each arm 20. A retro reflective element 26a such as a piece of retroreflective fabric having a shape substantially similar to the profile of the shallow recess 36, is received within the recess 36 and is attached thereto by, for example adhesive applied between the back of the retroreflective fabric and the recess bottom. The retroreflective surface of the fabric is therefore visible from the outer side of the arms 20.

Alternatively, the piece of retroreflective fabric used as retroreflective element 26a in reflective glasses 10a, may be replaced by pieces of retroreflective film such as pressure-sensitive adhesive film which is a sticker having a retroreflective surface and can be conveniently attached to the recess bottom without applying additional adhesive. Transfer film may also alternatively be used as the retroreflective element 26a. Retroreflective inks may also alternatively be used as the retroreflective element 26a for direct screen printing onto the recess bottom or at any location on the outer side of the arms 20 for decorative reflective images.

FIGS. 8A, 8B and 8C illustrate a structure of reflective glasses 10b according to a further embodiment. Reflective glasses 10b include components and features indicated by numerals similar to those of the reflective glasses 10 shown in FIGS. 1-4, and will not be redundantly described herein. The difference between the reflective glasses 10b and reflective glasses 10 of FIGS. 1-4 substantially lies in the attachment of retroreflective elements thereto. In the reflective glasses 10b, of FIGS. 8A-8C, each of the arms 20 has substantially solid and flat outer and inner side surfaces 20c and 20d. A retroreflective element such as a pressure-sensitive adhesive film 26b may be conveniently attached to the outer side surface 20c of the arm 20, substantially covering the entire outer side surface 20c. The arm 20 with the pressure-sensitive adhesive film 26b attached thereon is then overmoulded with for example, rubber 21 partially around or completely around the peripheral edge of the arm 20, sealing the seam between the pressure-sensitive adhesive film 26b and the outer side surface 20c of the arm. Optionally, the rubber 21 may be overmoulded to partially or fully cover the inner side surface 20d of the arm 20. According to this embodiment as shown in FIG. 8B, rubber 21 also covers a plurality of inner areas (in contrast to the area adjacent to the peripheral edge) of the inner side surface at the rear end of the arm, functioning as a holder for a firm contact with a user's head. This embodiment provides a convenient method and structure for fabrication of reflective glasses with, for example regular frames having relatively long reflective areas.

The above-mentioned alternative retroreflective materials are available in the market, and may be selected from, but not limited to 3M™ Scotchlite™ reflective materials which may be used with the reflective glasses 10 and 10a described herein. Any other suitable retroreflective materials may also be used as retroreflective elements for the reflective glasses.

Figure 9:
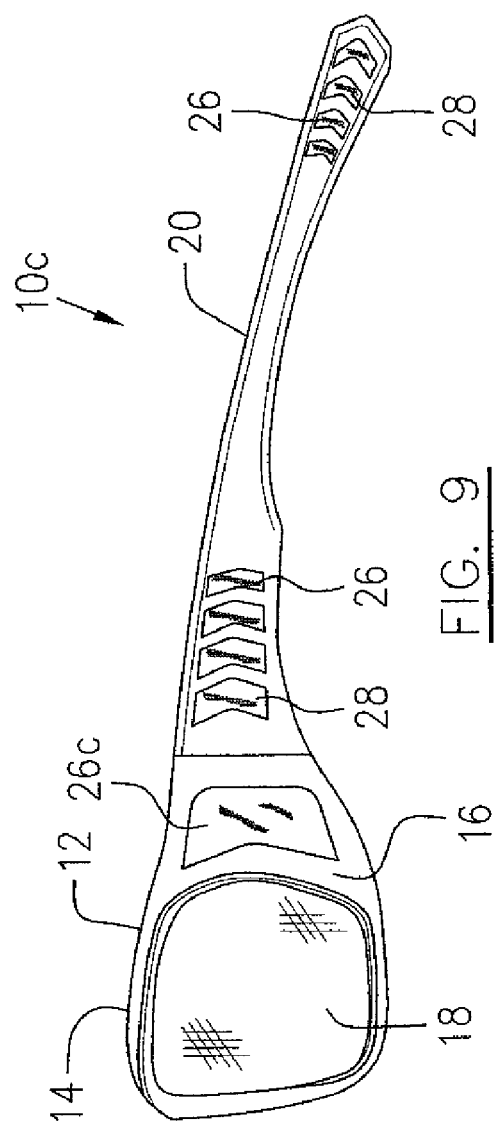
FIG. 9 is a side elevational view of reflective glasses according to a further embodiment.

FIG. 9 illustrates a structure of reflective glasses 10c according to a further embodiment. The reflective glasses 10c include the components and features indicated by numerals similar to those of reflective glasses 10 of FIGS. 1-4 and will not be redundantly described herein. In the reflective glasses 10 of FIGS. 1-4, the side sections of frame 12 generally include a pair of arms 20 only which are pivotally attached to the opposed side ends 16 of the main front section 14. In contrast, the side sections of the reflective glasses 10c each include a base portion 19 integrated with the main front section 14, and extending rearwardly from the respective opposed side end 16 of the main front section 14 to provide a side shield affixed to the main front section 14 for better protection for the eyes of the user. The side sections may further include the arms 20 which are pivotally joined to a rear end (not numbered) of the respective base sections 19. Alternatively, the side sections of the frame 12 may include the base sections 19 only. An elastic head strap (not shown) instead of the arms 20, may be attached to the base sections 19 for holding the reflective glasses 10c to the user's head in a goggles-type configuration. A retroreflective element 26c is attached to the base sections 19 using any suitable retroreflective materials with any suitable configuration of the base sections (such as recesses, recesses with openings, a flat outer side surface, etc.), similar to or different from those discussed above with reference to embodiments 10 and 10a illustrated in FIGS. 1-5C and 6-7, respectively.

According to a further embodiment, retroreflective elements such as a piece of retroreflective fabric may be added to glasses frame structure during molding formation processes of main front sections (if having integrated side sections) or individual arms.

The one or more retroreflective elements attached to side sections of a frame of a reflective glasses is visible by others in low-light conditions. Those retroreflective elements attached to the glasses can be observed from wide angles relative to the glasses and not only from a direction restricted to a right angle relative to the reflective surface of the retroreflective elements on the glasses provided the observer is near the light source Furthermore, the locations of the retroreflective elements on the glasses will not interfere with the user's vision through the lenses of the glasses as do those located in the front section of the frame, as in some prior art.

The reflective glasses of the present invention may include other components or features such as eye shields, face contact devices, etc. which are not part of this invention. Therefore, the principle of attaching retroreflective elements to the side sections of a frame of glasses is generally applicable to various types of glasses. For example, children's glasses including either sun-light protective lenses or prescription lenses may have retroreflective elements attached to the frames thereof, similar to the above-described embodiments. The retroreflective elements may be presented in various styles and brandings, for example through profiled openings 28 as shown in FIG. 1, including authorized copyright and/or trademark protected characters and/or symbols.

The embodiments of the invention described above are intended to be exemplary only. For example, the frame of the glasses in the above embodiments is described as being made of plastics, but may be made of any suitable material such as nylon, metal, etc. which can provide a relatively solid structure. The method of attaching the retroreflective elements to the glasses frames can be broadly applied to various types of frames, not only to the side sections including arms, but also to the front sections. Modifications and improvements to the above-described embodiments of the present invention may become apparent to those skilled in the art in light of a review of this disclosure and are intended to fall within the scope of the appended claims.

I claim:

1. A structure of reflective glasses comprising:
   a frame having a front section with opposed side ends for supporting at least one lens, the frame further including a pair of side sections extending rearwardly from the respective opposed side ends of the front section; and
   at least one retroreflective element attached to at least one of the side sections, the retroreflective element reflecting human-eye-visible light rays of any incidence angle along a vector parallel to but opposite in direction from a source of said light rays.

2. The structure as defined in claim 1 wherein the side sections comprise a pair of arms pivotable with respect to the front section.

3. The structure as defined in claim 2 wherein the at least one retroreflective element is attached to each of the arms.

4. The structure as defined in claim 2 wherein the retroreflective element is secured to at least one of the arms in a sandwich configuration between an inner layer and an outer layer of the arm, a retroreflective surface of the retroreflective element being exposed through at least one opening defined in the outer layer of the arm when the glasses are in use.

5. The structure as defined in claim 2 wherein the retroreflective element is received in a groove of at least one of the arms, the groove extending inwardly from an edge of the arm, at least one opening being defined in an outer wall of the groove to expose a retroreflective surface of the retroreflective element when the glasses are in use.

6. The structure as defined in claim 2 wherein the retroreflective element is a pressure-sensitive adhesive film attached to an outer side surface of at least one of the arms, a retroreflective surface of the retroreflective element being exposed when the glasses are in use.

7. The structure as defined in claim 6 wherein the pressure-sensitive adhesive film substantially covers the outer side surface, a seam between the pressure-sensitive adhesive film and the outer side surface being sealed by rubber along at least a section of a peripheral edge of the arm.

8. The structure as defined in claim 6 wherein the pressure-sensitive adhesive film substantially covers the outer side surface, a seam between the pressure-sensitive adhesive film and the outer side surface being sealed by rubber around an entire peripheral edge of the arm.

9. The structure as defined in claim 8 wherein the rubber covers an inner area of an inner side surface opposed to the outer side surface of the arm.

10. The structure as defined in claim 1 wherein the at least one lens is a prescription lens.

11. The structure as defined in claim 1 wherein the at least one lens is a sun-light protective lens.

* * * * *